United States Patent
Chagoly et al.

(10) Patent No.: US 7,823,137 B2
(45) Date of Patent: Oct. 26, 2010

(54) PROCESS AND IMPLEMENTATION FOR USING BYTE CODE INSERTION TO MODIFY A CLASS DEFINITION TO DEFINE AND USE PROBES FOR APPLICATION COMPONENTS

(75) Inventors: Bryan Christopher Chagoly, Austin, TX (US); Xiaoping Chen, Austin, TX (US); Andrew Jason Lavery, Austin, TX (US); Kirk Malcolm Sexton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1432 days.

(21) Appl. No.: 10/970,453

(22) Filed: Oct. 21, 2004

(65) Prior Publication Data

US 2006/0112037 A1 May 25, 2006

(51) Int. Cl.
G06F 9/44 (2006.01)
G06F 9/45 (2006.01)

(52) U.S. Cl. .............. 717/130; 717/148; 717/158; 717/116; 717/118

(58) Field of Classification Search .............. 717/118, 717/127, 130, 148, 581, 166
See application file for complete search history.

(56) References Cited

U.S. PATENT DOCUMENTS

| | | | | |
|---|---|---|---|---|
| 6,026,237 A * | 2/2000 | Berry et al. | ............ | 717/130 |
| 6,072,953 A * | 6/2000 | Cohen et al. | ............ | 717/166 |
| 6,151,703 A * | 11/2000 | Crelier | ............ | 717/136 |
| 6,314,558 B1 * | 11/2001 | Angel et al. | ............ | 717/118 |
| 6,351,844 B1 | 2/2002 | Bala | ............ | 717/4 |
| 6,397,379 B1 | 5/2002 | Yates, Jr. et al. | ............ | 717/5 |
| 6,643,842 B2 * | 11/2003 | Angel et al. | ............ | 717/130 |
| 6,681,381 B1 | 1/2004 | Soepenberg et al. | ............ | 717/118 |
| 6,721,941 B1 | 4/2004 | Morshed et al. | ............ | 717/127 |
| 6,742,178 B1 * | 5/2004 | Berry et al. | ............ | 717/130 |
| 6,760,903 B1 * | 7/2004 | Morshed et al. | ............ | 717/130 |
| 6,792,460 B2 * | 9/2004 | Oulu et al. | ............ | 709/224 |
| 7,096,466 B2 * | 8/2006 | Sokolov et al. | ............ | 718/1 |
| 7,240,335 B2 * | 7/2007 | Angel et al. | ............ | 717/130 |
| 7,251,810 B1 * | 7/2007 | Nolte | ............ | 717/130 |
| 7,275,239 B2 * | 9/2007 | Cuomo et al. | ............ | 717/130 |
| 7,281,242 B2 * | 10/2007 | Inamdar | ............ | 717/158 |
| 7,437,734 B2 * | 10/2008 | Rees et al. | ............ | 719/316 |
| 7,484,209 B2 * | 1/2009 | Avakian et al. | ............ | 718/1 |
| 7,493,622 B2 * | 2/2009 | Borkan | ............ | 719/310 |

(Continued)

OTHER PUBLICATIONS

Funika et al., "Dynamic Instrumentation of Distributed Java Applications Using Bytecode Modifications", SpringLink Date: Friday, May 12, 2006, retrieved from <http://www.springerlink.com/content/ur00014m03275421/fulltext.pdf>, total pages: 8.*

*Primary Examiner*—Tuan Q Dam
*Assistant Examiner*—Marina Lee
(74) *Attorney, Agent, or Firm*—Yee & Associates, P.C.; Jeffrey S. LaBaw

(57) ABSTRACT

A mechanism is provided for just-in-time instrumentation that uses bytecode insertion to modify a class definition to store a reference to the static class information to be used by probes. A hook is inserted to provide a callback to one or more probes. When the bytecode inserted hook is executed, the static class information is used to locate and execute the application probes.

18 Claims, 3 Drawing Sheets

U.S. PATENT DOCUMENTS

| | | | |
|---|---|---|---|
| 7,496,903 B2 * | 2/2009 | Rees et al. | 717/130 |
| 7,506,317 B2 * | 3/2009 | Liang et al. | 717/130 |
| 2001/0047510 A1 * | 11/2001 | Angel et al. | 717/4 |
| 2002/0029374 A1 | 3/2002 | Moore | 717/1 |
| 2002/0049963 A1 * | 4/2002 | Beck et al. | 717/130 |
| 2002/0095661 A1 * | 7/2002 | Angel et al. | 717/130 |
| 2003/0056200 A1 | 3/2003 | Li et al. | 717/128 |
| 2003/0115582 A1 | 6/2003 | Hundt et al. | 717/158 |
| 2003/0149960 A1 | 8/2003 | Inamdar | 717/118 |
| 2004/0123279 A1 * | 6/2004 | Boykin et al. | 717/158 |
| 2004/0133882 A1 * | 7/2004 | Angel et al. | 717/130 |
| 2004/0153996 A1 * | 8/2004 | Boykin et al. | 717/118 |
| 2005/0039171 A1 * | 2/2005 | Avakian et al. | 717/127 |
| 2005/0039172 A1 * | 2/2005 | Rees et al. | 717/130 |
| 2006/0112037 A1 * | 5/2006 | Chagoly et al. | 706/20 |

* cited by examiner

```
Public class Hooks
{

...
    StaticMethodInfo objStaticMethodInfo =
        objStaticClassInfo.getStaticMethodInfo(intIndex);
    IextendedMethodProbe[] objMethodProbe =
        objStaticMethodInfo.getMethodProbes();
    ...

}
```

PROCESS AND IMPLEMENTATION FOR USING BYTE CODE INSERTION TO MODIFY A CLASS DEFINITION TO DEFINE AND USE PROBES FOR APPLICATION COMPONENTS

BACKGROUND OF THE INVENTION

1. Technical Field

The present invention relates to data processing and, in particular, to monitoring application components. Still more particularly, the present invention provides a method, apparatus, and program product for using bytecode insertion to modify a class definition to define and use probes for application components.

2. Description of Related Art

Binary modification is a language-independent technique for changing programs. A binary modification tool reads a binary program, analyzes the program, modifies the program, and creates a new binary program that is ready for execution. The modification can range from inserting profiling code, optimizing the code, translating the code to a new architecture, etc. The binary modification method works on machine language instructions and is, therefore, programming language independent.

With binary modification, instrumentation of binaries basically involves inserting instructions in the binary program, requiring relocation of data and code. In order to do this, one must be able to disassemble the program into basic blocks and control flow graphs. This requires a sophisticated analysis of the binary code, often requiring an enormous amount of resources, both in time and space. Moreover, in order to be able to modify a binary program, one should know exactly what the program is doing. Without extra information about the binary (e.g., the compiler that generated the binary), it can be very hard to recognize data in code, code in data, and constructs such as user-level context switches, self-modifying code, hand-written assembly language, etc.

Just-in-time instrumentation (JITI) offers a solution to program modification that allows probes to be instrumented dynamically at class load time. JITI is a tool that uses byte code insertion to associate probes to customer applications. Probes are software agents that are used to gather information about the application while it is running. In JITI, probes are linked to parts of the application by locations and associations. Locations determine what part of the application is probed. Associations determine what probes are used at a given location. JITI, for example, uses a dynamic registry to map associations to locations on a per-invocation basis.

A probed class will load a hook for each method being probed. All objects associated with the probe will be instantiated each time the hook is invoked at run time. Furthermore, method probe context objects are created and a parameter list is calculated whether the probe is actually invoked or not. Thus, a drawback of JITI is that it is inefficient due to redundant and sometimes unnecessary computations that perform dynamic object creations and context preparation.

SUMMARY OF THE INVENTION

The present invention recognizes the disadvantages of the prior art and provides a mechanism for just-in-time instrumentation that uses bytecode insertion to modify a class definition to store a reference to the static class information to be used by probes. A hook is inserted to provide a callback to one or more probes. When the bytecode inserted hook is executed, the static class information is used to locate and execute the application probes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
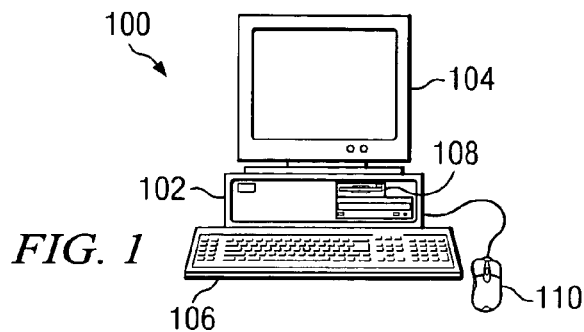
FIG. 1 is a pictorial representation of a data processing system in which the present invention may be implemented in accordance with a preferred embodiment of the present invention.
Figure 2:
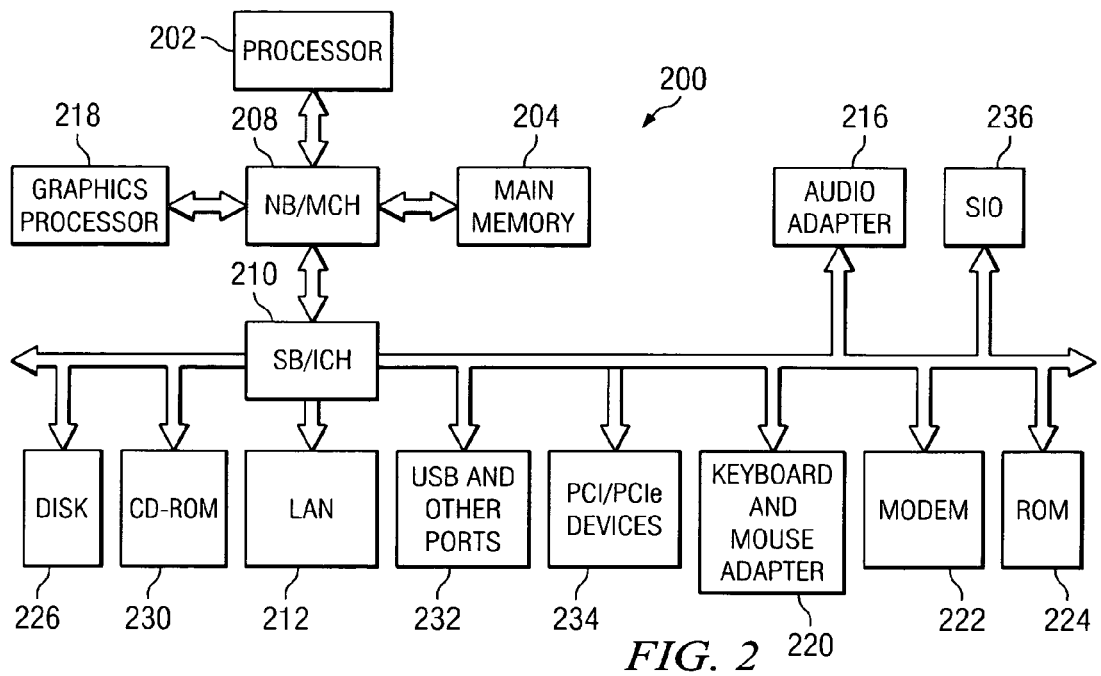
FIG. 2 is a block diagram of a data processing system in which the present invention may be implemented.

The present invention provides a method, apparatus and computer program product for using bytecode insertion to modify a class definition to define and use probes for application components. The data processing device may be a stand-alone computing device or may be a distributed data processing system in which multiple computing devices are utilized to perform various aspects of the present invention. Therefore, the following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eserver™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system 200 also may be a tablet computer, laptop computer, or telephone device in addition to taking the form of a PDA.

In accordance with a preferred embodiment of the present invention, a mechanism is provided for just-in-time instrumentation (JITI) that uses bytecode insertion to modify a class definition to store static class information to be used by probes. A hook is inserted to provide a callback to one or more probes. When the bytecode inserted hook is executed, class metadata is used to locate and execute the application probes, if any probes are associated with the particular method being executed.

Figure 3:
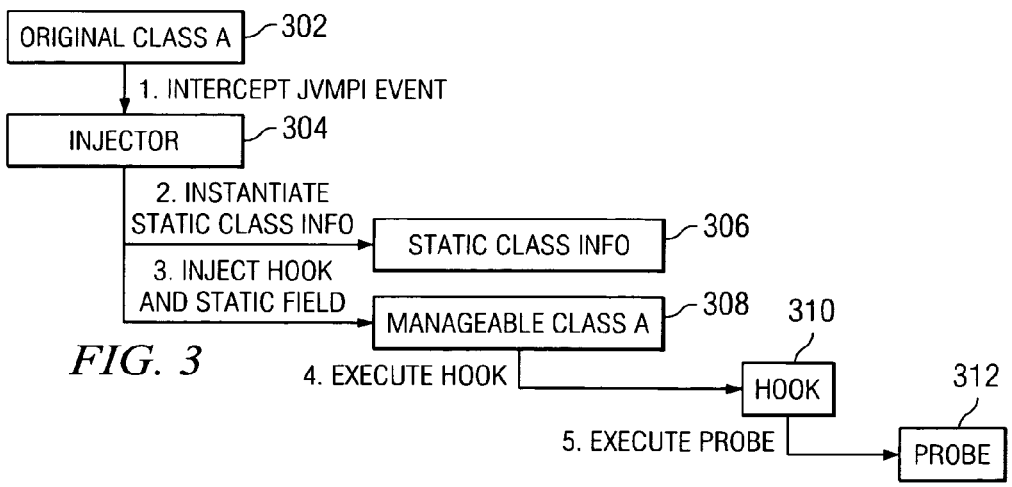
FIG. 3 depicts an example of bytecode insertion for just-in-time instrumentation in accordance with a preferred embodiment of the present invention.

FIG. 3 depicts an example of bytecode insertion for just-in-time instrumentation in accordance with a preferred embodiment of the present invention. Original class A 302 may use a profiler agent to link probes to methods of the class by locations and associations. The Java™ virtual machine profiler interface (JVMPI) is a two-way function call interface between the Java™ virtual machine and an in-process profiler agent. On one hand, the virtual machine notifies the profiler agent of various events, corresponding to, for example, heap allocation, thread start, etc. On the other hand, the profiler agent issues controls and requests for more information through the JVMPI. For example, the profiler agent can turn on/off a specific event notification, based on the needs of the profiler front-end. Thus, original class A 302 may issue a JVMPI load hook event when linking probes to methods.

In accordance with an exemplary embodiment of the present invention, injector 304 intercepts a JVMPI event associated with a probe (step 1) and instantiates a static class information object 306 (step 2). Static class information object 306 captures all the static information for original class A 302. For example, static class information object 306 may store an array of static method information objects, a probed class object, a probe class loader object, and so forth. A probed class object is an instance of the probed class. The probed class object represents classes and interfaces of the class that is probed in a running Java™ application. A probe class loader object is an object that is responsible for loading the class that is probed.

Injector 304 also creates a class metadata object for original class A 302. The class metadata object contains an array of method metadata objects. The class metadata object is an object that contains comprehensive information about the probed class, including an array of method metadata objects and the probed class name. The method metadata object is an object that contains comprehensive information about the probed method, including method name, descriptor, probe name, etc. This way, all of these objects must be instantiated only once during injection time per probed class rather than constructing the objects for every probe invocation. This information is static across multiple invocations.

Injector 304 also injects a reference to the hook and a static field, which is a reference to the static class information object, into the class to form manageable class A 308 (step 3). The JITI implementation of the present invention need not calculate the probed class information at run time because this information is in the bytecode of manageable class A 308.

When a probed method is executed at run time, the Java™ virtual machine (JVM) invokes hook 310 (step 4). Hook 310 is called with static class information object 306 passed to it. Hook 310 then gets the list of probes at this location. If the probe is to be invoked, hook 310 calculates the parameter list and instantiates a method probe context object. Hook 310 then executes probe 312.

Static class information object 306 contains an array of static method information objects. Every static method information object is associated with one method of manageable class A 308 and stores a reference to the method probes. This static data structure has a one-to-one mapping relationship to a manageable class A 308. The JITI implementation of the present invention allows hooks to look up probes through static class information object 306 and the static method information array. The JITI implementation of the present invention also postpones the creation of method probe context objects and calculation of the parameter list until the probe is being invoked, thus significantly reducing computation costs when probes are disabled.

Figures 4, 5:
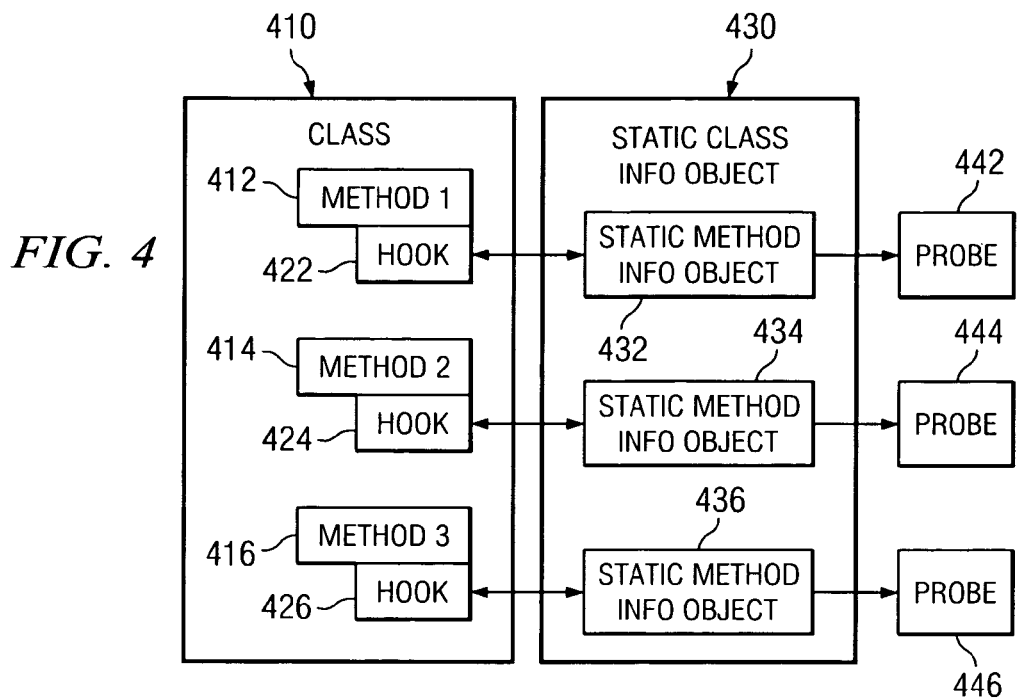
FIG. 4 is a block diagram illustrating probe invocation in accordance with an exemplary embodiment of the present invention.
FIG. 5 depicts an example of a portion of code that a hook uses to look up method probes in accordance with an exemplary embodiment of the present invention.

FIG. 4 is a block diagram illustrating probe invocation in accordance with an exemplary embodiment of the present invention. Class 410 includes method 1 412, method 2 414, and method 3 416. An injector used bytecode insertion to inject hook 422 in association with method 1 412, hook 424 in association with method 2 414, and hook 426 in association with method 3 416.

Static class information object 430 includes an array of static method information objects 432-436. Static method information object 432 is associated with method 1 412 and stores a reference to probe 442. Similarly, static method information object 434 is associated with method 2 414 and stores a reference to probe 444 and static method information object 436 is associated with method 3 416 and stores a reference to probe 446.

When method 1 412 is executed at run time, hook 422 uses static class information object 430 to look up a probe for method 1 412. When method 2 414 is executed at run time, hook 424 uses static class information object 430 to look up a probe for method 2 414. When method 3 416 is executed at run time, hook 426 uses static class information object 430 to look up a probe for method 3 416. FIG. 5 depicts an example of a portion of code that a hook uses to look up method probes in accordance with an exemplary embodiment of the present invention.

Figure 6:
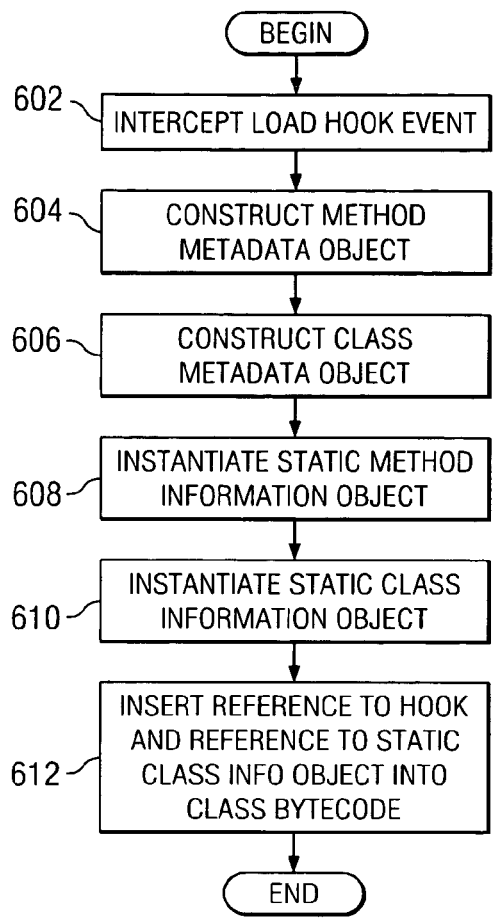
FIG. 6 is a flowchart illustrating the operation of performing just-in-time instrumentation in accordance with an exemplary embodiment of the present invention.

FIG. 6 is a flowchart illustrating the operation of performing just-in-time instrumentation in accordance with an exemplary embodiment of the present invention. Operation begins, at class load time. An injector intercepts a load hook event from the class being loaded (block 602). The injector instantiates a method metadata object for every probed method (block 604). The injector then creates a class metadata object for the probed method (block 606). The class metadata object contains an array of method metadata objects for all the probed methods in the class. Next, the injector instantiates a static method information object (block 608), which contains the name of the probe to the method. Finally, the injector instantiates a static class information object (block 610) that contains the comprehensive information needed to locate and invoke a probe. Thereafter, the injector inserts a reference to a hook and a reference to the static class information object into the class bytecode (block 612) and operation ends.

Figure 7:
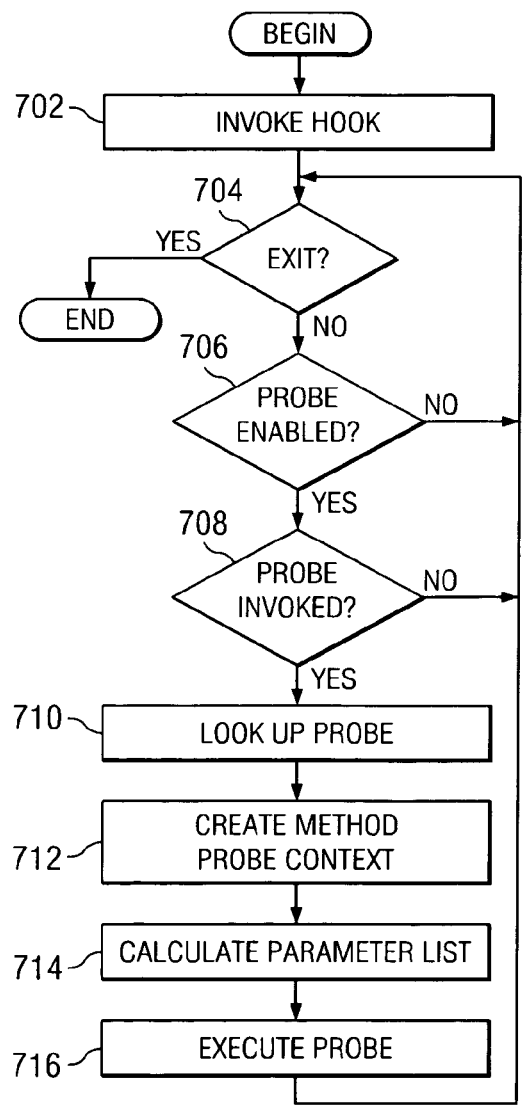
FIG. 7 is a flowchart illustrating the operation of a class with just-in-time instrumentation at run time in accordance with an exemplary embodiment of the present invention.

FIG. 7 is a flowchart illustrating the operation of a class with just-in-time instrumentation at run time in accordance with an exemplary embodiment of the present invention. Operation begins and the hook is invoked (block 702). A determination is made as to whether an exit condition exists (block 704). An exit condition may exist, for example, when the class completes execution. If an exit condition exists, operation ends.

If an exit condition does not exit in block 704, a determination is made as to whether the probe is enabled (block 706). An algorithm may be used to determine whether the probe is enabled. If a probe is not enabled, operation returns to block 704 to determine whether an exit condition exists.

If the probe is enabled in block 706, a determination is made as to whether the probe is invoked (block 708). The probe is invoked when a method to be probed executes. If a probe is invoked in block 708, the hook looks up a probe (block 710). The hook then creates the method probe context object (block 712) and the hook calculates a parameter list for the probe (block 714). Then, the hook executes the probe (block 716). Next, operation returns to block 702 to determine whether an exit condition exists.

Thus, the present invention solves the disadvantages of the prior art by reducing the run-time overhead of CPU usage and memory usage. The JITI implementation of the present invention directly associates probes to the class metadata to eliminate dynamic object creation. The JITI implementation of the present invention also captures all the static information for the probed class in a static class information object and modifies the definition of the probed class to add a member variable to reference the static class information. As a result, the static class information object is only instantiated once during injection time for the probed class, rather than constructing static information each time a probe is invoked. In addition, the JITI implementation of the present invention postpones calculating run time variables until the monitored method is actually invoked, thus reducing the computation costs when probes are disabled.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, performed by a data processing system comprising a memory, for just-in-time instrumentation, the method comprising:

responsive to a class loading a hook for a probe, creating a static class information object that stores static information for the class;

inserting a reference to the hook in metadata of the class; and inserting a reference to the static class information object in the metadata of the class, wherein the static class information object comprises a reference to the probe, wherein the creating of the static class information object, the inserting of the reference to the hook and the inserting of the reference to the static class information object are all performed by the data processing system using the memory.

2. The method of claim 1, wherein the static class information object that is created responsive to the class loading the hook for the probe includes an array of static method information objects, wherein each static method information object in the array of static method information objects is associated with a static method in the class, and wherein each static method information object in the array of static method information objects stores a reference to a method probe.

3. The method of claim 1, further comprising:
responsive to a probed method being executed, using the static class information object to look up a method probe, wherein a reference to the method probe is contained in the static class information object that was created responsive to the class loading the hook for the probe, and the reference to the method probe is used to look up the method probe in response to the probed method being executed; and
executing the method probe.

4. The method of claim 3, further comprising:
responsive to a probed method being executed, creating method probe context information using information in the static class information object.

5. The method of claim 3, further comprising:
responsive to a probed method being executed, calculating, using information in the static class information object, a parameter list to be used by the method probe.

6. A method, performed by a data processing system comprising a memory, for just-in-time instrumentation, the method comprising:
responsive to a class loading a hook for a probe, creating a static class information object that stores static information for the class;
inserting a reference to the hook in the metadata of the class; and
inserting a reference to the static class information object in the metadata of the class, wherein the static class metadata object contains an array of method metadata objects, and wherein each method metadata object in the array of method metadata objects includes a method name, a descriptor, and a probe name, and wherein the creating of the static class information object, the inserting of the reference to the hook and the inserting of the reference to the static class information object are all performed by the data processing system using the memory.

7. A method, in a data processing system, for just-in-time instrumentation, the method comprising:
responsive to a class loading a hook for a probe, creating a static class information object that stores static information for the class;
inserting a reference to the hook and a reference to the static class information object in the class;
responsive to a probed method being executed, using the static class information object to look up a method probe, wherein a reference to the method probe is contained in the static class information object that was created responsive to the class loading the hook for the probe, and the reference to the method probe is used to look up the method probe in response to the probed method being executed; and
executing the method probe.

8. A data processing system apparatus for just-in-time instrumentation, the data processing system apparatus including a hardware data processor and further comprising:
means for creating a static class information object that stores static class information for a class in response to the class loading a hook for a probe;
means for inserting a reference to the hook in metadata of the class; and
means for inserting a reference to the static class information object in the metadata of the class, wherein the static class information object that is created responsive to the class loading the hook for the probe includes an array of static method information objects, wherein each static method information object in the array of static method information objects is associated with a static method in the class, and wherein each static method information object in the array of static method information objects stores a reference to a method probe.

9. An apparatus for just-in-time instrumentation, the apparatus comprising:
means for creating a static class information object that stores static information for the class in response to a class loading a hook for a probe;
means for inserting a reference to the hook and a reference to the static class information object in the class;
means for using the static class information object to look up a method probe in response to a probed method being executed, wherein a reference to the method probe is contained in the static class information object that was created responsive to the class loading the hook for the probe, and the reference to the method probe is used to look up the method probe in response to the probed method being executed; and
means for executing the method probe.

10. A computer recordable medium encoded with a computer program product that is operable when executed by a data processing system for providing just in time instrumentation, the computer program product comprising:
instructions for creating a static class information object that stores static information for the class in response to a class loading a hook for a probe;
instructions for inserting a reference to the hook in metadata of the class; and
instructions for inserting a reference to the static class information object in the metadata of the class, wherein the static class information object comprises a reference to the probe.

11. The computer program product of claim 10, wherein the static class information object includes an array of static method information objects.

12. The computer program product of claim 11, wherein each static method information object in the array of static method information objects is associated with a static method in the class.

13. The computer program product of claim 12, wherein each static method information object in the array of static method information objects stores a reference to a method probe.

14. The computer program product of claim 10, further comprising:
instructions for using the static class information object to look up a method probe in response to a probed method being executed, wherein a reference to the method probe is contained in the static class information object that was created responsive to the class loading the hook for the probe, and the reference to the method probe is used to look up the method probe in response to the probed method being executed; and instructions for executing the method probe.

15. The computer program product of claim 14, further comprising:

instructions for creating, using information in the static class information object, method probe context information to be used by the method probe in response to a probed method being executed.

16. The computer program product of claim 14, further comprising:

instructions for calculating, using information in the static class information object, a parameter list to be used by the method probe in response to a probed method being executed.

17. A computer recordable medium encoded with a computer program product that is operable when executed by a data processing system for providing just in time instrumentation, the computer program product comprising:

instructions for creating a static class information object that stores static information for the class in response to a class loading a hook for a probe;

instructions for inserting a reference to the hook in the metadata of the class; and instructions for inserting a reference to the static class information object in the metadata of the class, wherein the class metadata object contains an array of method metadata objects, wherein each method metadata object in the array of method metadata objects includes a method name, a descriptor, and a probe name.

18. A computer recordable medium encoded with a computer program product that is operable when executed by a data processing system for providing just in time instrumentation, the computer program product comprising:

instructions for creating a static class information object that stores static information for the class in response to a class loading a hook for a probe;

instructions for inserting a reference to the hook and a reference to the static class information object in the class;

instructions for using the static class information object to look up a method probe in response to a probed method being executed, wherein a reference to the method probe is contained in the static class information object that was created responsive to the class loading the hook for the probe, and the reference to the method probe is used to look up the method probe in response to the probed method being executed; and instructions for executing the method probe.

\* \* \* \* \*